United States Patent
Reßler (10) Patent No.: US 12,403,812 B2
(45) Date of Patent: Sep. 2, 2025

(54) SUSPENDED SUPPORT STRUCTURE, IN PARTICULAR BED STRUCTURE, FOR A VEHICLE

(71) Applicant: Stefan Reßler, Fohnsdorf (AT)

(72) Inventor: Stefan Reßler, Fohnsdorf (AT)

(*) Notice: Subject to any disclaimer, the term of this patent is extended or adjusted under 35 U.S.C. 154(b) by 389 days.

(21) Appl. No.: 17/913,922

(22) PCT Filed: Mar. 9, 2021

(86) PCT No.: PCT/AT2021/060085
§ 371 (c)(1),
(2) Date: Sep. 23, 2022

(87) PCT Pub. No.: WO2021/189088
PCT Pub. Date: Sep. 30, 2021

(65) Prior Publication Data
US 2023/0256890 A1 Aug. 17, 2023

(30) Foreign Application Priority Data
Mar. 25, 2020 (AT) .............. A 50248/2020

(51) Int. Cl.
*B60P 3/39* (2006.01)
*A47C 17/80* (2006.01)
(Continued)

(52) U.S. Cl.
CPC ............. *B60P 3/39* (2013.01); *A47C 17/80* (2013.01); *B60J 3/002* (2013.01); *B60P 3/38* (2013.01)

(58) Field of Classification Search
CPC .... B60P 3/39; B60P 3/38; B60J 3/002; A47C 17/80; A47C 17/84
(Continued)

(56) References Cited

U.S. PATENT DOCUMENTS 1,524,525 A   1/1925  Oxendorf
5,984,404 A * 11/1999 Novoa ................... B60P 3/39
                                                   296/190.01
(Continued)

FOREIGN PATENT DOCUMENTS

DE   25 49 541   5/1977
DE   32 25 758   1/1984
(Continued)

OTHER PUBLICATIONS

Int'l Search Report (Form PCT/ISA/210) conducted in Int'l Appln. No. PCT/AT2021/060085 (Jun. 15, 2021).
(Continued)

*Primary Examiner* — Robert G Santos
(74) *Attorney, Agent, or Firm* — GREENBLUM & BERNSTEIN, P.L.C.

(57) ABSTRACT

A support structure, in particular a bed structure, for a vehicle such as a recreational vehicle, having a support body with a support surface for supporting cargo or a person on the support surface and at least one lifting device with which the support body can be arranged in the vehicle in a suspended manner such that the support body can move relative to the vehicle in a movement direction. To achieve a high practicability, the support structure includes at least one securing device with which the support body can be secured to an inner vehicle wall of the vehicle in the movement direction.

25 Claims, 2 Drawing Sheets

(51) Int. Cl.
  *B60J 3/00*   (2006.01)
  *B60P 3/38*   (2006.01)

(58) Field of Classification Search
  USPC .................................. 5/118, 10.2; 296/170
  See application file for complete search history.

(56) References Cited

U.S. PATENT DOCUMENTS

| | | | |
|---|---|---|---|
| 6,231,114 B1* | 5/2001 | Warmoth | A47C 17/84 |
| | | | 5/118 |
| 7,178,180 B2* | 2/2007 | Gardner | B60P 3/39 |
| | | | 5/118 |
| 7,444,691 B2* | 11/2008 | Gardner | A47C 17/84 |
| | | | 5/118 |
| 2006/0130231 A1 | 6/2006 | Gardner | |
| 2007/0180613 A1* | 8/2007 | Gardner | B60P 3/39 |
| | | | 5/118 |
| 2015/0239387 A1 | 8/2015 | Marasco et al. | |
| 2023/0256890 A1* | 8/2023 | Reßler | B60J 3/002 |
| | | | 5/118 |

FOREIGN PATENT DOCUMENTS

| | | | |
|---|---|---|---|
| DE | 89 13 590 | 6/1990 | |
| DE | 20 2006 006 151 | 10/2006 | |
| DE | 10 2006 044 410 | 6/2007 | |
| EP | 3 006 264 | 4/2016 | |
| WO | WO-2021189088 A1 * | 9/2021 | .............. B60J 3/002 |
| WO | WO-2025017526 A1 * | 1/2025 | ................ B60P 3/39 |

OTHER PUBLICATIONS

Int'l Written Opinion (Form PCT/ISA/237) conducted in Int'l Appln. No. PCT/AT2021/060085 (Jun. 15, 2021).

Austria Office Action conducted in counterpart Austria Appln. No. A 50248/2020 (Aug. 12, 2020).

* cited by examiner

SUSPENDED SUPPORT STRUCTURE, IN PARTICULAR BED STRUCTURE, FOR A VEHICLE

The invention relates to a support structure, in particular a bed structure, for a vehicle such as a recreational vehicle, having a support body with a support surface for supporting cargo or a person on the support surface and at least one lifting device with which the support body can be arranged in the vehicle in a suspended manner such that the support body can move relative to the vehicle in a movement direction.

Bed structures or cots arranged in a vehicle, for example a recreational vehicle, are known from the prior art. To confront a challenge posed by a horizontal orientation of a lying surface of the bed structure also requiring a horizontal positioning of the vehicle, it has proven effective to arrange the lying surface such that it is suspended in the vehicle by straps. By adjusting a length of the straps, a horizontal orientation of the lying surface can thus be set independently of a positioning of the vehicle. In addition, it can be considered advantageous that the bed structure can thereby typically move in a movement direction due to the suspended positioning thereof with the straps, whereby vibrations of the vehicle, for example while the vehicle is in motion, are advantageously transmitted to a lesser extent to a person lying on the lying surface.

This is addressed by the invention. The object of the invention is to specify a support structure, in particular a bed structure, of the type named at the outset which has a high practicality.

The object is attained according to the invention in that the support structure of the type named at the outset comprises at least one securing device with which the support body can be secured to an inner vehicle wall of the vehicle in a movement direction.

Suspended support structures, particularly where said structures are designed as bed structures, are typically accompanied by the nuisance that the advantageous movability of the support body hampers use during a loading or unloading of the support surface of the support body. Where the support structure is designed or used as a lying surface for a person, it has been shown that the movability of the support body can cause a physical discomfort of the person, in particular in the form of nausea. Furthermore, it can be considered disadvantageous that, depending on the arrangement of the support body in the vehicle, in particular when the vehicle is in motion, movements, in particular oscillating movements, of the support body can occur, as a result of which the support body is pushed against an inner vehicle wall, so that damage to the support body or the inner vehicle wall can occur. With a securing device according to the invention, these nuisances and challenges can be resolved or at least reduced.

The support body is normally embodied as a support platform. If the support body is embodied or is to be used as a bed structure or bed, the support surface of the support body can be formed with or as a slat frame or with a mattress that in particular is arranged on a slat frame of the support body.

By providing that the support body can be secured to an inner vehicle wall of the vehicle, preferably tensioned to the inner vehicle wall, in a movement direction in a use state using the securing device, a movability of the support body in or against the movement direction can be limited in a practicable manner without undermining advantageous effects of a suspended arrangement of the support body in the vehicle. Depending on the application conditions, it can thereby be beneficial if the support body can be secured to the inner vehicle wall using the securing device such that a movement of the support body in or against the movement direction is only enabled to a limited extent, or is completely prevented.

It is advantageously provided that the securing device is embodied to secure the support body to the inner vehicle wall with or by means of a pressing, tensioning, spreading, and/or pushing of the support body against the inner vehicle wall. For this purpose, the securing device can comprise at least one securing means with which a tension force and/or compression force can be applied to the support body, in particular in an adjustable manner, in order to secure the support body to the inner vehicle wall in the aforementioned manner. It is practical if the securing device comprises a securing means drive coupled to the securing means, in order to drive the securing means. The securing means drive can be embodied as a mechanical, pneumatic, hydraulic, and/or electric drive. Typically, the securing device comprises a securing means control unit with which the securing means drive can be controlled. The securing means control unit is normally arranged on the support body, preferably such that it is at least partially embedded in the support body. Typically, the securing means control unit comprises at least one operating element which can be actuated by a user in order to control the securing means control unit.

For an increased robustness and easy handling, it has proven effective if the securing device has a tensioning means in order to tension the support body to the inner vehicle wall using the tensioning means. The tensioning means can, for example, be embodied as or with a cable, a chain, a strap, and/or a rod. The securing device can also comprise multiple tensioning means of this type. Typically, the securing means is formed with or by the tensioning means.

A high practicability can be achieved if the securing device comprises a tensioning means adjusting device with which a usable length of the tensioning means, in particular in a securing state, can be varied or adjusted, in order to tension the support body to the inner vehicle wall using the tensioning means. For a simple handling, it is beneficial to this end if the tensioning means adjusting device comprises a tensioning means drive coupled to the tensioning means, in order to change a usable length of the tensioning means. The tensioning means drive can be embodied as a mechanical, pneumatic, hydraulic, and/or electric drive. It has proven effective if the tensioning means adjusting device comprises a tensioning means winder with which the tensioning means can be reversibly wound or unwound, in order to change the usable length of the tensioning means. Alternatively or cumulatively, it is beneficial for a simple design if the tensioning means adjusting device comprises a tensioning means bolt that is mounted in a bolt guide and can be moved relative to the bolt guide, wherein the tensioning means bolt is coupled to the tensioning means so that a usable length of the tensioning means can be varied or adjusted by moving the tensioning means bolt relative to the bolt guide. In particular, a tension of the tensioning means can thus be changed or adjusted in a simple manner in the securing state. It is practical if the tensioning means adjusting device comprises a locking device in order to lock the tensioning means bolt in a form fit and/or force fit in different positions relative to the bolt guide.

An adjusted usable length of the tensioning means can thus be set. A robust design can be achieved if the locking device is formed with an engagement piece connected to the tensioning means bolt or to the bolt guide, which engagement piece can be engaged in a form fit in different engagement positions on the bolt guide or the tensioning means bolt in order to lock the tensioning means bolt relative to the bolt guide. It is expedient if the bolt guide or the tensioning means bolt comprises catches corresponding to the engagement piece, into which catches the engagement piece can be inserted in a form fit so that a relative position between the tensioning means bolt and the bolt guide is set. A simple handling can be achieved if the tensioning means adjusting device is formed with an operating handle, comprising two operating handle levers that are spaced apart from one another and can be moved relative to one another, which levers are embodied and coupled to the tensioning means bolt and bolt guide such that, in the use state or securing state, a relative position between the tensioning means bolt and the bolt guide can be varied or adjusted through a pressing together of the operating handle levers by a user. It is expedient if the tensioning means drive is embodied to drive the tensioning means winder or the tensioning means bolt. To facilitate a tensioning of the tensioning means, it is beneficial if the tensioning means adjusting device comprises a transmission device for transmitting a force applied to the tensioning means using the tensioning means drive, for example a gear mechanism or a block and tackle. Typically, the tensioning means adjusting device comprises a tensioning means adjustment control unit with which the tensioning means drive can be controlled. The tensioning means adjustment control unit is normally arranged on the support body, preferably such that it is at least partially embedded in the support body. Typically, the tensioning means adjustment control unit comprises at least one operating element that can be actuated by a user in order to control the tensioning means adjustment control unit.

Securing state typically denotes a state in which the support body is secured or tensioned to the inner vehicle wall using the securing device or the tensioning means, respectively.

Typically, it is provided that the support structure comprises a lifting device in order to arrange the support body in the vehicle in a suspended manner so that cargo, for example luggage, or one or more persons can be arranged or placed on the support surface of the support body. For this purpose, the lifting device is in most cases embodied with at least one lifting means, such as a cable, a chain, and/or a strap, for example. Normally, the lifting device comprises multiple lifting means in order to arrange the support body in a suspended manner using the lifting means.

For a high stability, it is thereby beneficial if the multiple lifting means are arranged on or contact the support body such that they are spaced apart from one another, preferably on opposite sides of the support body. It has proven effective if the multiple lifting means contact the support body opposite from one another in relation to an axis of symmetry and/or principal axis of inertia of the support body. A simple design can be achieved if the at least one lifting means forms a strap loop wherein the support body is hung into the strap loop, in particular such that it is guided in a sliding manner. For this purpose, the support body can comprise one or more diverting guides, in order to guide the lifting means in a sliding manner. The design is particularly robust if the strap loop is guided over contact points on the support body which lie opposite from one another in relation to an axis of symmetry and/or principal axis of inertia of the support body, at which contact points the lifting means contacts or supports the support body.

Expediently, the support body can for this purpose comprise multiple diverting guides, via which the lifting means is guided, on sides of the support body opposite from one another and/or such that the diverting guides lie opposite from one another in relation to the axis of symmetry or principal axis of inertia of the support body.

Normally, it is provided that the lifting device comprises one or more mounting elements with which the lifting device can be fixed in place on an inner vehicle wall or inner vehicle ceiling, in order to suspend the support body on the inner vehicle wall or inner vehicle ceiling, respectively.

Use state expediently denotes a state in which the support body has been arranged in a suspended manner using the lifting device. Movement direction typically denotes a direction in which the support body can move or be moved in a defined manner using the lifting device in the use state.

The movement direction typically constitutes a pivot direction in which the support body can be pivoted in the use state.

Normally, it is provided that the support body is arranged in a suspended manner using the lifting device such that the support surface is essentially horizontally oriented. A stable positioning of the support body with a simultaneous support of cargo and/or a person on the support surface is thus easily realizable.

A high usability can be achieved if the support body is reversibly height-adjustable using the lifting device in the use state. In this manner, a position or spacing of the support body or the support surface thereof relative to a base surface of the vehicle can be adjusted as needed and/or depending on the size of a cargo being arranged on the support surface, or the support body can be positioned in the vehicle such that storage space is optimized, depending on the application conditions. Accordingly, it is expedient if the support body can be reversibly lowered or raised using the lifting device. A simple feasibility can be achieved if a usable length of the at least one lifting means, in particular multiple or all lifting means, can be varied, in particular adjusted, in order to height-adjust, in particular to lower or raise, the support body. Usable length of the lifting means thereby typically denotes a length, used in the use state or effective, of the lifting means between a location on the lifting means at which the lifting means contacts the support body and a location on the lifting means which is arranged at a bearing point on which the support body is suspended using the lifting means. For this purpose, it is beneficial if the usable lengths of the lifting means can be varied, in particular adjusted, simultaneously. Expediently, a lifting device control unit can be present with which the usable length(s) of the one or more lifting means can be controllably adjusted.

It has proven effective if the lifting device comprises at least one lifting means winder in order to actuate the at least one lifting means, so that the usable length thereof can be varied or adjusted. A simple design can be achieved if the lifting means winder is embodied to actuate multiple or all lifting means, in particular simultaneously, in order to vary the usable lengths thereof. It can also be provided that the lifting device comprises multiple lifting means winders, wherein different lifting means winders each actuate different lifting means. Expediently, the lifting means winder can comprise one or more drums with which the one or more lifting means can be reversibly wound or unwound, in order to vary the usable lengths thereof. The lifting means winder can comprise a lifting means winder drive for operating the lifting means winder. The lifting means winder drive is usually formed with a manual drive and/or a motor, in particular electric motor, for operating the lifting means winder, in order to actuate the one or more lifting means or to vary the usable lengths thereof. The lifting device control unit is then typically embodied to control, in particular to regulate, the at least one lifting means winder or the lifting means winder drive. In this manner, the usable length of the lifting means can be adjusted using the lifting device control unit such that doing so is practicable for use.

For a robust design, it is expedient if the lifting means winder is arranged on the support body.

Preferably, the lifting means winder, in particular the drum thereof, is thereby arranged on the support body such that it is at least partially, preferably completely, inside the support body or embedded in the support body. A simple design can be achieved if the drum of the lifting means winder runs along the support body and/or through the support body such that multiple lifting means that contact different positions or contact points on the support body can be wound or unwound using the drum. For a pronounced stability, it is beneficial if the drum essentially runs along a longitudinal axis, in particular an axis of symmetry or principal axis of inertia, of the support body.

Typically, it is provided that, in the use state, the support body is height-adjustable, or can be lowered and/or raised, using the lifting device between multiple support positions in which cargo or a person can be arranged on the support surface. A storage space of the vehicle can thus be utilized such that it is optimized for use. Here, it is normally provided that the support surface is essentially horizontally oriented in the use state, in order to arrange cargo and/or a person on the support surface. It is expedient if the lifting device is embodied and/or controllable such that an angular position or inclination of the support surface is maintained or does not change during a height adjustment or lowering and/or raising of the support body. As a result, the support surface can thus be moved, or raised or lowered, in a parallel manner during the height adjustment or the lowering or raising of the support body. The height-adjustment of the support body between multiple support positions can thus be carried out without jeopardizing a stability of a storage of cargo arranged on the support surface, or of a person arranged on the support surface. It shall be understood that a height adjustment or lowering and/or raising of the support body using the lifting device should typically be viewed relative to a suspension point, in particular to a suspension point in a fixed position on the vehicle, on which the support body is suspended using the lifting device, or relative to the vehicle.

A high practicability can be achieved if the lifting device is embodied to tilt the support body about at least one tilt axis, in particular in a tilting direction perpendicular to the movement direction, in the use state. The support body can thus be transferred to a non-use state, in which the support body is not used to support cargo or persons, and can be arranged in the vehicle in a space-saving manner. It is beneficial if the lifting device is embodied to tilt the support body such that the support surface is essentially vertically oriented. The support body can thus be arranged in a space-saving manner in a non-use state. This can easily be realized if the lifting device is embodied to vary or adjust usable lengths of different lifting means separately from one another, in order to change the usable lengths by different magnitudes for a tilting of the support body. For this purpose, it is expedient if multiple aforementioned lifting means winders are provided in order to actuate the lifting means separately from one another. A particularly high usability can be achieved if the usable lengths of all lifting means can be adjusted separately from one another. Accordingly, for a particularly high usability, it is beneficial if the support body can be height-adjusted and tilted using the lifting device. It is advantageously provided that the lifting device is embodied to vary or adjust an inclination of the support surface in the use state, preferably such that the support surface is essentially horizontally oriented. In this manner, an inclination of the vehicle in which the support structure is arranged can be compensated. For this purpose, it is expedient if usable lengths of the lifting means can be varied or adjusted separately from one another, in particular in the aforementioned manner, in order to adjust the inclination of the support surface. It is beneficial if the lifting device is embodied to keep the inclination or an orientation of the support surface constant. Expediently, the lifting device control unit can be embodied to control or regulate, preferably automatically, the inclination of the support surface or usable lengths of the lifting means such that an orientation of the support surface remains constant, preferably horizontal. An orientation of the support surface is thus maintained when an inclination of the vehicle changes. For this purpose, a sensor for measuring an orientation of the support surface can be present.

It is advantageous if the lifting device is embodied such that, in the use state, a suspension of the support surface can be reversibly released using a portion of the lifting means or using individual lifting means, in order to tilt the support body into a non-use state. Preferably, the support body can thus be tilted into a non-use state in which the support body is only suspended on one side using lifting means or in which the support surface is essentially vertically oriented. The support body can thus be transferred to the non-use state of the support body in a particularly simple manner. For this purpose, the lifting device can expediently comprise one or more connection fasteners which releasably connect multiple parts of the lifting device to one another, or the lifting device to the support body. It has proven effective if connection fasteners are provided that releasably connect multiple lifting means segments to one another and/or connect one or more lifting means to the support body, and/or connect one or more lifting means to a bearing point on which the support body is suspended using the lifting means. In this manner, the support body can be transferred to the non-use state by releasing one or more connection fasteners. The support body can thus be arranged in a particularly space-saving manner in the non-use state, and can preferably be secured to the inner vehicle wall, in particular using the securing device. It is advantageous if the securing device comprises at least one spring element in order to secure the support body to the inner vehicle wall, or to tension the support body to the inner vehicle wall, such that it is loaded with a spring force of the spring element, so that a movement of the support body in a movement direction against the spring force is enabled to a limited extent. In this manner, a movement of the support body in a movement direction can be limited while avoiding or reducing pressure peaks. In particular, impact forces, in particular impact force peaks, between the support body and the inner vehicle wall can thus be damped, so that cargo arranged on the support surface and/or a person arranged on the support surface is protected. This applies in particular while the vehicle is in motion. This can be practicably implemented in that, particularly in the securing state, the spring force of the spring element is applied to the tensioning means or the tensioning means is loaded with the spring force. It is practicable if a first securing end of the spring element is arranged on the support body and the tensioning means is arranged at a second securing end of the spring element, which second securing end can be deflected against the spring force of the spring element relative to the first securing end, in order to apply the spring force to the tensioning means in the securing state.

Expediently, the securing device can comprise multiple spring elements. For a high robustness, it has proven effective if the spring element is embodied with or as a helical spring.

To reduce a noise generation during a tensioning or contracting of the spring element formed with a helical spring, it has proven advantageous if separating pieces are arranged between coils of the helical spring in order to prevent directly adjacent coils from colliding with one another. For this purpose, the separating pieces are typically arranged between directly adjacent coils or coil sections thereof, or protrude at least partially therebetween. Depending on the specific form of the helical spring, it can be sufficient if separating pieces are only present between a partial amount of the coils. It has been shown that a considerable noise reduction can already be achieved if one separating piece is allocated to more than a third, in particular more than half, of the coils in the aforementioned manner. A particularly low-noise operation can be achieved if one separating piece is allocated to more than two-thirds, in particular essentially all, of the coils in the aforementioned manner. A high robustness can be achieved if the separating pieces are embodied, in particular monolithically, as part of a separating element that is arranged on the helical spring. Typically, the separating pieces are formed with or from plastic, in particular rubber. It is practicable if the separating element is formed with a tube that is pulled over multiple, in particular all, coils along a longitudinal direction or tensioning direction of the helical spring. In this manner, the helical spring or the coils thereof can be protected against contaminants, which can in particular also intensify a noise generation. It is beneficial if the tube is pulled over the coils such that the tube covers gaps forming between the coils during a tensioning of the helical spring. In this manner, an ingress of contaminants between the coils can be avoided. Typically, the tube forms an envelope along an outer contour of the helical spring in a longitudinal cross section of the helical spring. A high robustness can be achieved if the separating elements are formed with folds of the tube or with one or more protrusions projecting away from a wall of the tube, which protrusions extend between the coils. For a low noise generation and a low wear, it is beneficial if the helical spring is arranged inside the tube such that the coils are moved relative to the tube during a tensioning of the helical spring. A simple and resilient design can be achieved if the separating element, in particular the tube, is formed with one or more plastic strips that are in particular wound onto the helical spring. The tube can essentially have a shape of a cylinder or a helix. A simple implementation can be achieved in that at least one plastic strip is arranged on the helical spring, in particular is wound onto the helical spring, in a tensioned state of the helical spring so that, during a subsequent relaxation of the helical spring, folds formed with the plastic strips extend between the coils of the helical spring in order to prevent a collision or contact of the coils.

A high usability can be achieved if the securing device comprises an operating device with which the spring force can be adjusted, in particular in a securing state in which the support body is tensioned to the inner vehicle wall using the securing device. In this manner, the spring force acting on the support body can be adjusted according to the application situation, in particular depending on a weight of a cargo arranged on the support surface or of a person arranged on said surface. Thus, while the vehicle is in motion, for example, a different spring force can be set than in a non-moving state of the vehicle. A practicable implementation can be achieved if a deflection of the spring element can be changed using the operating device in order to adjust the spring force. For a simple handling, it is beneficial if the operating device comprises an operating device drive that is or can be coupled to the spring element, in order to change or adjust a deflection of the spring element. The operating device drive can be embodied as a mechanical drive, pneumatic, hydraulic, and/or electric drive. A robust design can be achieved if the operating device drive is coupled to the spring element using a coupling means, in particular a coupling cable, wherein a tension of the coupling means can be changed using the operating device drive in order to adjust the deflection of the spring element. It has proven effective if the operating device comprises an operating device winder with which the coupling means or coupling cable can be reversibly wound in order to change a tension of the coupling means. It is then expedient if the operating device drive is embodied to drive the operating device winder. To facilitate a deflection of the spring element, it is beneficial if the operating device comprises a transmission device for transmitting a force applied to the coupling means using the operating device drive, for example a gear mechanism or a block and tackle. Typically, the operating device comprises an operating device control unit with which the operating device drive can be controlled. The operating device control unit is normally arranged on the support body, preferably such that it is at least partially embedded in the support body. Typically, the operating device control unit comprises at least one operating element that can be actuated by a user in order to control the operating device control unit.

A simple design can be achieved if the coupling means is formed with or by the tensioning means. A practicable implementation can be achieved if the operating device is embodied to adjust a tension of the tensioning means in the securing state in order to change the deflection of the spring element. For this purpose, it can be provided that the second securing end of the spring element comprises a diverting element, for example a diverting roller, wherein the tensioning means is arranged at the second securing end of the spring element such that it is guided in a sliding manner by the diverting element and is guided further to the operating device, in particular the operating device winder, so that a tension of the tension cable can be changed or adjusted using the operating device or operating device winder in the securing state. In particular, an application-adapted embodiment can be achieved in this manner, since the operating device can be flexibly arranged at different positions on the support body, without impairing a functionality of the spring element or operating device. According to aforementioned statements, it is then expedient if the operating device drive is coupled to the spring element via the tensioning means, wherein a tension of the tensioning means can be changed using the operating device drive, in order to adjust the deflection of the spring element. Accordingly, it is beneficial if the tensioning means can be reversibly wound with the operating device winder in order to change a tension of the tensioning means. It shall be understood that the other aforementioned embodiment features of the operating device then apply analogously to the tensioning means forming the coupling means. In particular, the transmission device for transmitting a force applied to the tensioning means using the drive device can be embodied, for example. In particular, the operating device can be formed with or by the tensioning means adjusting device; in particular the operating device drive can be formed by the tensioning means drive, and/or the operating device winder by the tensioning means winder, and/or the tensioning means adjustment control unit by the operating device unit.

It has proven effective if the securing device, in particular the tensioning means, is embodied such that the support body can be secured, in particular in a detachable manner, to the inner vehicle wall with the formation of a form fit and/or force fit. Expediently, the tensioning means typically comprises for this purpose, in particular at a tensioning means end of the tensioning means, a securing element with which the tensioning means can be secured to the inner vehicle wall in a form fit and/or force fit. It is beneficial if a securing fastener, in particular in the form of a quick-release fastener, is present in order to secure the tensioning means to the inner vehicle wall in a form fit and/or force fit, preferably in a detachable manner. A simple handling can be achieved if the securing fastener is embodied as a quick-release fastener. A quick-release fastener allows a connection to be released or closed rapidly and without tools. It is beneficial if the quick-release fastener is embodied as a snap lock. It is thereby typically provided that a form-fitting and/or force-fitting connection between the tensioning means and the inner vehicle wall can be produced in that a snap element is elastically deformed and a form fit and/or force fit then effected. Normally, the form fit or force fit can be reversed again by a renewed elastic deformation of the snap element.

The securing fastener can be implemented in a simple manner if the tensioning means comprises a first securing element that can be connected in a form fit and/or force fit to a second securing element that corresponds in shape to the first securing element and is arranged on the inner vehicle wall, in that one of the securing elements is or can be inserted into the other securing element. For a robust connection, it has proven effective if one of the securing elements thereby engages behind the other securing element to produce a form-fitting connection. Typically, the first securing element is thereby embodied as a securing pin and the second securing element is embodied as a securing pin receiver, or vice versa.

For this purpose, it can expediently be provided that the support structure comprises one or more second securing elements which can be mounted, typically in a fixed position, preferably in a form fit and/or force fit, on the inner vehicle wall in order to secure the support body or the tensioning means to, or tension said body or means to, the inner vehicle wall in the use state by connecting, particularly in a detachable manner, the first securing element to one of the second securing elements. A suitable second securing element can thus be chosen depending on the application conditions, in particular a set height and/or inclination of the support body. It is practical if multiple second securing elements are embodied as part of a securing rail, wherein the securing rail can be mounted, typically in a fixed position, on the inner vehicle wall. Here, it is expedient if the multiple second securing elements are arranged spaced apart from one another on the securing rail along a longitudinal direction of the securing rail. In many cases, multiple securing rails of this type are provided which can be mounted on one or more inner vehicle walls such that said rails adjoin or are spaced apart from one another. It has proven effective if the multiple second securing elements are embodied as securing pin receivers into which a first securing element embodied as a securing pin can be inserted, in order to produce a form-fitting and/or force-fitting connection. The securing pin receivers are typically embodied to engage behind a section of the securing pin in order to produce a form-fitting connection between the securing pin receiver and the securing pin. A simple handling can be achieved if the securing rail comprises a guide that is embodied such that a first securing element connected to one of the second securing elements of the securing rail can be moved to another of the second securing elements of the securing rail such that it is guided by the guide. If the second securing elements are embodied as securing pin receivers, it has proven effective if the guide is embodied as a groove which connects the securing pin receivers to one another. It is expedient if the guide is embodied to engage behind a section of a securing pin inserted into the guide, so that the securing pin can be moved in the groove such that it is guided in a form fit by the guide. In particular, the securing rail can be embodied with the second securing elements or securing receivers corresponding to a tie-down track or airline rail known from the aircraft industry, and the first securing element preferably as a tie-down ring the corresponds in shape thereto. It is advantageous if the support structure comprises multiple aforementioned securing devices in order to secure the support body to one or more inner vehicle walls of the vehicle, in particular to tension the support body thereto, in different movement directions. Here, it has proven effective if the securing devices are arranged on different, in particular opposite, sides of the support body.

It can be that the aforementioned second securing elements or securing rails are already present in a vehicle, in particular a recreational vehicle, especially if the vehicle is embodied according to a vehicle below according to the invention. It is then sufficient if the support structure comprises the securing fastener formed with at least one first securing element.

A high robustness can be achieved if the support structure comprises at least one spacer element which, in the use state, can be arranged between the support body and the inner vehicle wall, so that the support body can be or is pressed against the spacer element in the securing state. In this manner, a risk of damage to the support body can be reduced. In particular, the spacer element serves to compensate an uneven shape of the inner vehicle wall, or to create a stable surface against which the support body can be pressed in the securing state. Preferably, multiple spacer elements are provided. In many cases, the spacer element essentially has a form of a rectangular prism or cube. It is expedient if the spacer element comprises a fixing device with which the spacer element can be secured, preferably detachably, to the support body and/or the inner vehicle wall in a form fit and/or force fit. It is practical if the fixing device is embodied to magnetically secure the spacer element to the support body and/or the inner vehicle wall. For this purpose, the spacer element can expediently comprise one or more magnets, in particular in the form of magnetic layers arranged on a surface of the spacer element. It has proven effective if the spacer element has an elastically deformable surface in order to reduce impact force peaks during a movement of the support body relative to the spacer element. Typically, the spacer element or the surface thereof is formed with plastic and/or rubber. It is expedient if the surface of the spacer element has a coefficient of elasticity or an elasticity modulus that is smaller than a coefficient of elasticity or an elasticity modulus of a support body surface of the support body, onto which surface the surface of the spacer element can be or is pressed during the securing.

For a robust and low-error operability, it is beneficial if the spring element and/or the tensioning means drive or operating device drive and/or the tensioning means winder or operating device winder is at least partially, preferably completely, arranged such that it is inside the support body or is embedded in the support body. Alternatively or cumulatively, it has proven effective if the tensioning means and/or the coupling means are arranged such that they run at least partially inside of the support body.

It is advantageous if the support body comprises at least one awning with an awning cover, wherein the awning cover is connected, such that it can move, in particular can be extended, relative to an upper structure of the support body that forms the support surface, or relative to the support surface, to said upper structure. In this manner, the support structure or support body can be used to create a protection from the sun in the use state, in particular when a door of the vehicle is open, in that the awning cover is moved or extended, preferably through an open door of the vehicle. Typically, the awning cover can be moved, in particular extended, into an application state in which the awning cover projects out past the upper structure. A height and/or inclination of the awning cover in an extended state of the awning cover can advantageously be adjusted by a height adjustment and/or tilting of the support body using the lifting device. It is practical if the awning comprises an awning adjustment device with which, in an application state of the awning cover, a height or spacing and/or inclination of the awning cover relative to the upper structure can be adjusted. For this purpose, the awning can comprise a mechanical, pneumatic, hydraulic, and/or electric awning drive. For a high stability of the awning cover, it is beneficial if the awning comprises at least one awning stay, in order to brace the awning cover on a ground of a surrounding environment of the support structure, for example a ground on which the vehicle is arranged, or a base surface of the vehicle using the awning stay. The awning stay can be connected, in particular detachably, to the awning cover. It has proven effective if the awning stay is connected to the awning cover such that it can be pivoted relative to the awning cover. It is beneficial for a simple and robust positioning if a longitudinal extension of the awning stay is variable. The awning stay or the longitudinal extension thereof can thus be adapted to a specific surrounding environment. A robust design can be achieved if the awning stay comprises sections that can telescope into one another, in order to vary the longitudinal extension of the awning stay.

It is practical if the support body comprises a table formed with a table top, wherein the table top is arranged, such that it can be reversibly moved, in particular lowered, relative to a remaining body of the support body that forms the support surface, on said remaining body. In this manner, the support structure or support body can be used to provide a table as needed in the use state. The remaining body can thereby be the aforementioned upper structure. The table top can normally be reversibly moved relative to the remaining body from a non-use state into a use state. Typically, the table top is arranged on the remaining body such that it can be extended or lowered. The table or the table top is preferably arranged on the remaining body, or connected thereto, on a side of the support body facing away from the support surface, typically an underside. A height and/or inclination of the table top in the use state of the table top can advantageously be adjusted by a height adjustment and/or tilting of the support body using the lifting device. It is practical if the table comprises an adjusting device with which the table top is connected to the remaining body such that it can be moved, in particular extended or lowered, relative to the remaining body. Preferably, the adjusting device is embodied to adjust a height or spacing and/or inclination of the table top relative to the remaining body. For this purpose, the table can comprise a mechanical, pneumatic, hydraulic, and/or electric table drive. For a high practicability, it is beneficial if the adjusting device is formed with a guide system, in order to move, in particular to extend or lower and/or incline, the table top relative to the remaining body such that it is guided using the guide system. It is beneficial if the adjusting device or the guide system is embodied such that an angular position of the table top is maintained during a movement of the table top using the adjusting device or the guide system. For this purpose, the guide system can be embodied with or as a parallelogram guide. For a high robustness, it has proven effective if the table top is, in a non-use state of the table, arranged such that it can be at least partially, preferably completely, embedded in the remaining body.

It is practical if the support body comprises one or more carrier devices, preferably on a side of the support body opposite from the support surface, in order to secure objects of utility to the support body. The carrier device can in particular be embodied to secure sporting equipment, for example a kayak, a bicycle, and/or fishing equipment, to the support body. It is expedient if the carrier device is embodied with or as a laundry line device in order to hang laundry on the support body. It is practical if the carrier device comprises one or more magnetic magnet attachments in order to magnetically secure objects of utility to the support body in a detachable manner using the magnet attachments.

It is practicable if the support body comprises one or more fixing elements which are embodied correspondingly to an aforementioned second securing element or an aforementioned securing rail in order to mount objects of utility on the support body. The fixing elements can be embodied as part of the carrier device.

A high practicability for use can be achieved if the support body comprises one or more storage spaces in which objects of utility can be inserted for storage. The storage space is preferably formed with a compartment.

It is beneficial if the support body comprises one or more electrical outlets in order to provide electrical devices with electrical energy by plugging said devices into the outlets. Here, it is expedient if the outlets can be connected to a vehicle energy supply device, in particular a vehicle battery or a vehicle storage battery and/or a vehicle generator, of the vehicle in order to supply electrical energy to the outlets.

Advantageously, a vehicle is provided with a, in particular aforementioned, support structure, with the support structure being arranged in a suspended manner in the vehicle using the lifting device such that the support structure can move relative to the vehicle or a body of the vehicle in a movement direction, wherein the support structure comprises at least one aforementioned securing device with which the support body can be or is secured, in particular detachably, to an inner vehicle wall of the vehicle in the movement direction. According to the aforementioned features, effects, and advantages of a support structure, in particular a support structure according to the invention, a vehicle having a support structure of this type also enables a high practicability.

Typically, the support body can be or is tensioned to the inner vehicle wall using the securing device, in particular according to aforementioned statements. It is expedient if the support structure is arranged in a suspended manner on an interior vehicle ceiling of the vehicle using the lifting device.

For a simple handling, it is beneficial if one or more inner vehicle walls of the vehicle comprise one or more, particularly as explained above, second securing elements or securing rails with second securing elements, in order to secure or tension the support body to the second securing elements using the securing device, in particular one or more first securing elements of the securing device.

It is advantageously provided that the support body comprises at least one, in particular aforementioned, awning, wherein the awning can be moved, in particular extended, through an open door of the vehicle. For a high stability, it is beneficial if the awning comprises an awning stay with which the awning cover can be braced on a surrounding environment of the support structure, in particular a ground on which the vehicle is arranged, or a base surface of the vehicle. Expediently, the vehicle can comprise a stay fixing element that is embodied such that it corresponds in shape to a stay segment of the awning stay, in order to detachably connect the stay fixing element to the stay segment in a form fit and/or force fit, in particular by being inserted into one another. The vehicle can comprise multiple stay fixing elements of this type.

It has proven effective if the vehicle comprises at least one stay placement device that can be moved relative to a body of the vehicle into a bracing position protruding away from the body, in order to brace the awning stay against the awning cover in the bracing position with the stay placement device. In this manner, a bracing of the awning stay on the vehicle itself or the body thereof can be practicably implemented, in particular independently of a ground under the vehicle, on which ground the vehicle is arranged. A body of the vehicle is thereby typically formed with or by a body shell, a base frame, and/or vehicle walls of the vehicle, depending on the vehicle type. Normally, it is provided that, by moving the stay placement device into the bracing position, a dimension of the vehicle, in particular a length or a width of the vehicle, is increased. The stay placement device thus constitutes an auxiliary structure for a practicable bracing of the awning stay. Expediently, the stay placement device can be formed with a stay placement surface on which the awning stay can be placed. For a simple handling, it is beneficial if the stay placement device is embodied such that it can be extended or folded away from the body of the vehicle, preferably at the rear side or flank side on the vehicle, in order to move the stay placement device into the bracing position. In particular, the stay fixing element can be embodied as part of the stay placement device, in particular the stay placement surface. For a high versatility, it is beneficial if the vehicle comprises multiple stay placement devices in different positions on the vehicle. Said devices are preferably arranged at both the flank side and the rear side on the vehicle.

A high user friendliness can be achieved if the stay placement device is formed with an extendable compartment, such as a drawer, in order to place or brace the awning stay on a base surface of the compartment in an extended state of the compartment. The compartment is thereby normally arranged at the rear side or flank side on the vehicle such that it can be extended over an edge of the body of the vehicle. For a high versatility, at least one compartment each can be arranged both at the rear side and at the flank side on the vehicle. It has proven effective if, in an unextended state of the compartment, the compartment is arranged inside of the vehicle, in particular in a cargo space of the vehicle, so that when a vehicle door, in particular a cargo space door of the vehicle, is open the compartment can be extended through the vehicle door. The cargo space door is in most cases a side door or flank door or rear door of the vehicle. It is expedient if the compartment is embodied to correspond to the size of the awning stay such that the awning stay can be stowed in the compartment in a non-use state.

Additional features, advantages, and effects follow from the exemplary embodiments described below. In the drawings which are thereby referenced.

Figure 1:
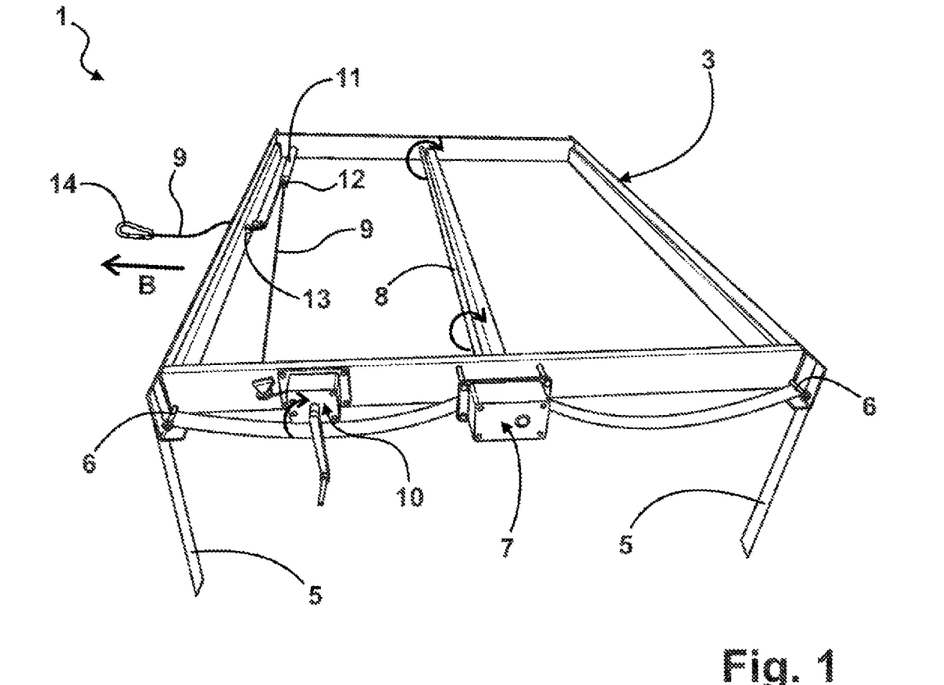
FIG. 1 shows a schematic illustration of a support structure for a vehicle.

FIG. 1 shows a schematic illustration of a support structure 1 for a vehicle 15 which is embodied as a bed structure or bed. The support structure 1 comprises a support body 2 that is formed with a frame 3 and a lifting device contacting the frame 3, in order to arrange the support body 2 or the frame 3 in a suspended manner in the vehicle 15 using the lifting device so that the support body 2 can move relative to the vehicle 15 in a movement direction B, clearly illustrated in FIG. 2. It is provided that a support surface 4 is arranged on the frame 3 to support a person on the support surface 4. In FIG. 1, the support surface 4 is not illustrated for the sake of comprehensibility and clarity, in order to depict a design of the support body 2 in a comprehensible manner. The support surface 4 of the support body 2 is typically arranged on the frame 3 such that it is supported by the frame 3, or in particular rests on the frame 3. The lifting device is formed with multiple lifting means (lifters) embodied as straps 5, in order to suspend the support body 2 or frame 3 in the vehicle 15 using the straps 5, clearly illustrated in FIG. 2. Preferably, one of the straps 5 respectively forms a strap loop into which the support body 2 or frame 3 is hung such that it is guided in a sliding manner. As shown in FIG. 1, one or more diverting guides 6 can expediently be arranged on the frame 3 for this purpose, via which guides 6 the respective strap 5 is guided. For a pronounced stability, multiple strap loops formed with straps 5 are preferably arranged on the frame 3 such that they are spaced apart from one another along an axis of extension, typically a longitudinal axis, of the support body 2 or frame 3. A practicable design can be implemented if, in order to form the strap loop transversely to the axis of extension, the respective strap 5 is guided over contact points that lie opposite from one another in relation to the axis of extension, at which contact points the strap 5 or the strap loop contacts or supports the frame 3. For this purpose, diverting guides 6 lying opposite from one another in relation to the axis of extension can be arranged on the frame 3. In FIG. 1, a strap loop formed with a strap 5 and arranged at an extension end of the frame 3 can be seen, wherein the strap 5 is guided over two diverting guides 6 arranged on the frame 3 lying opposite from one another in relation to the axis of extension. It shall be understood that a strap loop of this type formed with a further strap 5 is typically arranged at the other extension end-protruding into the drawing plane of FIG. 1—of the frame 3.

The lifting device is embodied to adjust the height of, in particular to lower or raise, the support body 2 using the lifting device in the use state. For this purpose, it is provided that the usable lengths of the straps 5 can be varied in a controllable manner.

Expediently, the lifting device comprises to this end at least one, preferably electrically driven, lifting means (lifter) winder 7 with which the straps 5 can be wound, in order to vary the usable lengths thereof. A robust design can be realized if the lifting means winder 7 comprises at least one drum 8 in order to wind the straps 5 using the drum 8. As can be seen in FIG. 1, the drum 8 can be guided along an extension, in particular a longitudinal extension, of the frame 3 so that multiple straps 5 can be wound using the drum 8. The drum 8 or the longitudinal axis thereof is preferably oriented essentially parallel to the support surface 4. According to FIG. 1, the drum 8 extends, starting from the lifting means winder 7, from one extension end of the frame 3 to the other extension end of the frame 3 lying opposite therefrom, in order to also wind the strap 5 arranged at the opposite extension end using the drum 8. In this way, the usable lengths of the straps 5 can be simultaneously adjusted in an easily implementable manner. Alternatively, however, multiple lifting means winders 7 can also be provided in order to wind or unwind the straps 5 separately from one another.

To limit a movability of the support body 2 or frame 3, a securing device with a tensioning means 9 embodied as a tension cable is present in order to tension the support body 2 or frame 3 to an inner vehicle wall 16 of the vehicle 15 in a movement direction B using the tensioning means 9. The securing device comprises a tensioning means winder 10 embodied as a tension cable winder, with which tensioning means winder 10 the tensioning means 9 can be reversibly wound or reversibly unwound, in order to change a usable length of the tensioning means 9. The support body 2 can thus be practicably tensioned to the inner vehicle wall 16 by changing the usable length of the tensioning means 9. It has proven effective if the tensioning means winder 10 comprises a mechanical tensioning means drive that can preferably be driven by a user via an operating lever. It is furthermore provided that the securing device comprises a spring element 11 embodied as a helical spring, in order to tension the support body 2 or frame 3 to the vehicle inner wall 16 against a spring force of the spring element 11 using the tensioning means 9, so that a movement of the support body 2 in movement direction B against the spring force is enabled to a limited extent. A movement of the support body 2 relative to the inner vehicle wall 16, or in particular impact forces occurring between the support body 2 and the inner vehicle wall 16, can thus be damped. The spring element 11 is preferably embodied as a helical spring.

It is beneficial if the securing device comprises an operating device with which the deflection of the spring element 11 in a securing state, in which the support body 2 is secured or tensioned to the inner vehicle wall 16 using the tensioning means 9, can be adjusted. In this manner, a spring force acting on the support body 2 can be adapted to a specific application situation. It is practical if the operating device is implemented with the tensioning means winder 10 in that, in the securing state, a deflection of the spring element 11 can be changed or adjusted by adjusting a tension of the tensioning means 9 using the tensioning means winder 10. As can be seen in FIG. 1, this can be practically realized if a first securing end of the spring element is arranged in a fixed position on the frame 3 and a second securing end of the spring element 11 that can be deflected relative to the first securing end against the spring force of the spring element 11 comprises a diverting element 12, for example a diverting roller, wherein the tensioning means 9 is, starting from the tensioning means winder 10, guided in a sliding manner over the diverting element 12 of the spring element 11 and from there, in most cases over a further diverting element arranged on the frame 3, is guided further for a securing of the tensioning means 9 to the inner vehicle wall 16, or is guided further to the inner vehicle wall 16 in the securing state, so that a deflection of the spring element 11 can be changed by changing a tension of the tensioning means 9. The tensioning means 9 is thereby typically guided outward in the direction of the inner vehicle wall 16 through a pass-through opening 13 of the frame 3, in order to secure the tensioning means 9 to the inner vehicle wall 16. Expediently, the tensioning means 9 comprises for this purpose a securing element 14, normally at a tensioning means end of the tensioning means 9, with which securing element 14 the tensioning means 9 can be arranged on the inner vehicle wall 16 in a form fit and/or force fit. The securing element 14 can be embodied as a hook, in particular a carabiner hook, for example. It has proven effective if the spring element 11 and the tensioning means winder 10 are arranged on different frame walls, in particular frame walls lying opposite from one another, of the frame 3, wherein the spring element 11 is preferably arranged on the inner wall side and/or the tensioning means winder 10 is preferably arranged on the outer wall side on the respective frame wall. In this manner, the spring element 11 is protected against external ambient influences and a compact design of the support body 2 can be achieved.

Figure 2:
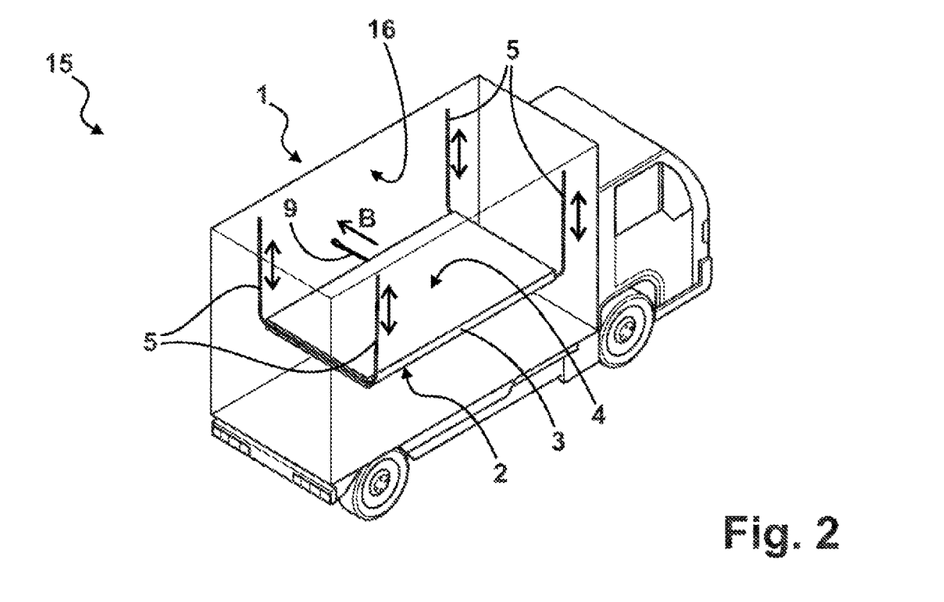
FIG. 2 shows a schematic illustration of the support structure from FIG. 1 in a vehicle.

FIG. 2 shows a schematic illustration of a vehicle 15 with the support structure 1 from FIG. 1 in which the support body 2 is arranged in a suspended manner using the lifting device or the straps 5 thereof, so that the support body 2 can move in a movement direction B. For this purpose, the straps 5 are normally mounted, preferably in a fixed position, on an inner vehicle ceiling of the vehicle 15. The support body 2 is preferably oriented such that the support surface 4 of the support body 2 is essentially horizontally oriented, in order to arrange a person on the support surface 2. As can be seen in FIG. 2, the support body 2 can be height-adjusted, in particular raised or lowered, by varying the usable lengths of the straps 5. Preferably, a raising and lowering of the support body 2 can be carried out using the lifting device, without changing an inclination of the support surface 4. Further visible in FIG. 2 is the securing device formed with the tensioning means 9, with which securing device the support body 2 can be or is tensioned to an inner vehicle wall 16 of the vehicle 15 in a movement direction B. In this manner, the support surface 4 of the support body 2 can be changed independently of an orientation of the vehicle 15, or the support surface 4 can be at least partially decoupled from vibrations of the vehicle 15. Because the support body 2 is tensioned to the inner vehicle wall 16 under a spring force load of the spring, a support of a person on the support surface 4 with reduced pivoting motions of the support body 2 is enabled. In particular, compression force peaks between the support body 2 and the inner vehicle wall 16 can be reduced, or vibrations can be damped in particular while the vehicle 15 is in motion.

Figure 3:
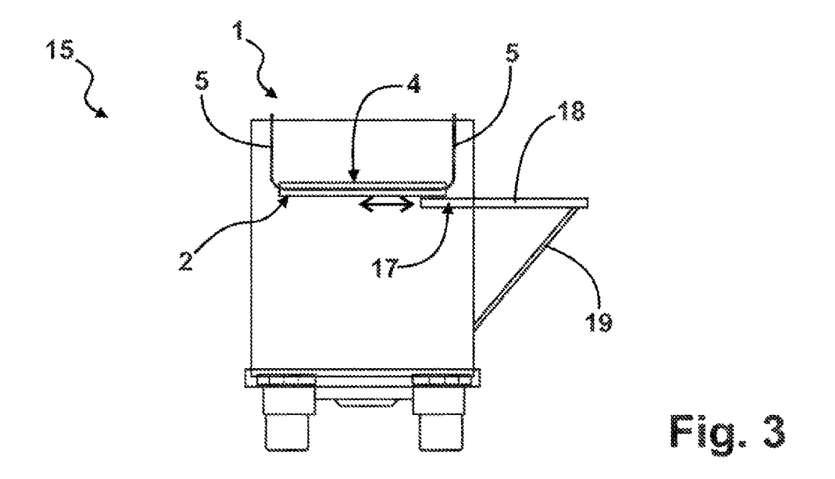
FIG. 3, FIG. 4, FIG. 5 show schematic illustrations of a support structure arranged in a vehicle with a movable awning.
Figure 4:
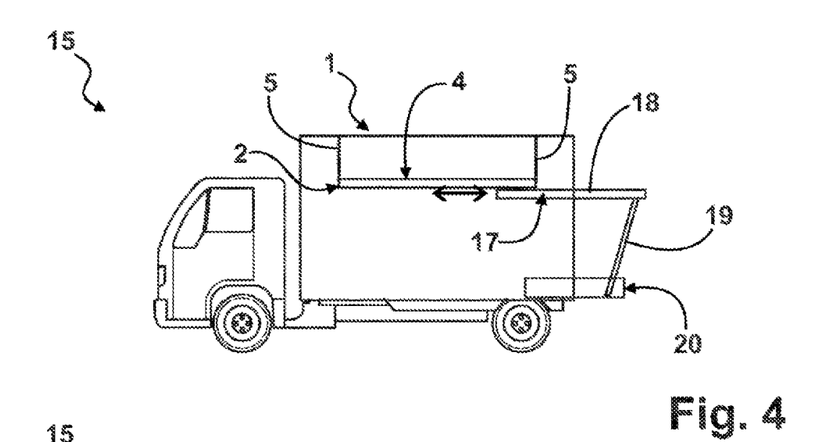
Figure 5:
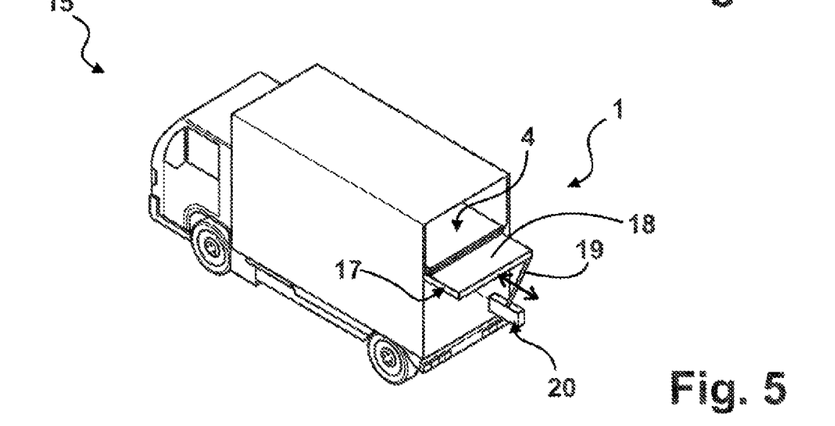

FIG. 3 through FIG. 5 show schematic illustrations of the vehicle 15 according to FIG. 2 with the support structure 1 according to FIG. 1, wherein it is additionally provided that the support structure 1 comprises an awning 17. The awning 17 comprises an awning cover 18 and is connected, such that it can be extended relative to an upper structure of the support body 2 which forms the support surface 4, to said upper structure. In this manner, the support structure 1 can be used to create a protection from the sun in the use state. Here, it is expediently provided that the awning cover 18 can be extended through an open door of the vehicle 15. It has proven effective if the support structure 1 is arranged or embodied in the vehicle 15 such that the awning cover 18, as illustrated in FIG. 3, can be extended through an open side door or flank door of the vehicle 15. Alternatively or cumulatively, the support structure 1 can be arranged or embodied in the vehicle 15 such that the awning 17 can be extended through an open rear door of the vehicle 15, illustrated in FIG. 4 and FIG. 5. Because the support body 2 also can be or is tensioned to the inner vehicle wall 16 using the securing device, a high stability of the awning cover is also enabled when wind forces act on the awning cover 18.

For a high stability of the awning cover in an extended state of the awning 17, it is beneficial if the awning 17 comprises an awning stay 19 with which the awning cover 18 can be braced on a body of the vehicle 15, in particular a vehicle floor. For a simple handling, it is beneficial if the awning stay 19 is pivotably connected to the awning cover 18. A high practicability can be achieved if the vehicle 15 comprises a stay placement device that can be moved relative to the body of the vehicle 15 into a bracing position protruding away from the body, in order to brace the awning stay 19 against the awning cover 18 in the bracing position using the stay placement device. This can be robustly implemented if the stay placement device is formed with an extendable drawer 20 in order to place awning stay 19 on a base surface of the drawer 20, or to brace the awning stay 19 using the base surface of the drawer 20, in an extended state of the drawer 20, clearly illustrated in FIG. 4 and FIG. 5. The drawer 20 can thereby, depending on the arrangement and embodiment of the support structure 1 or awning 17, expediently be arranged at a side or flank or at the rear of the vehicle 15. For a high robustness, it is practicable if the drawer 20 can be pulled out through the open side door or flank door or rear door.

Because the support body 2 can be arranged in the vehicle 15 in a suspended manner and can be or is tensioned to the inner vehicle wall 16 using the securing device or the tensioning means 9 thereof, the advantages of a suspended arrangement of the support body 2 can be utilized and, at the same time, a disadvantageous movability, in particular in or against the movement direction B, can be limited according to the specific application situation. Because the spring force of the spring element 11 is applied to the tensioning means 9 of the securing device in the securing state so that a movement of the support body 2 in the movement direction B against the spring force is enabled to a limited extent, undesired pivoting motions of the support body 2 can be limited and impact forces or vibrations damped, so that these only act to a reduced extent on a person arranged or lying on the support surface 4 of the support body 2.

The invention claimed is:

1. A support structure for a vehicle, comprising:
   a support body with a support surface for supporting cargo or a person;
   at least one lifting device structured and arranged to support the support body in a suspended manner in the vehicle so that the support body is movable relative to the vehicle in a movement direction; and
   at least one securing device structured and arranged to limit movability of, in the movement direction, the support body to an inner vehicle wall of the vehicle.

2. The support structure according to claim 1, wherein the at least one securing device comprises a tensioner structured and arranged to tension the support body to the inner vehicle wall.

3. The support structure according to claim 2, wherein the at least one securing device comprises a tensioner adjusting device with which a usable length of the tensioner is variable or adjusted to tension the support body to the inner vehicle wall.

4. The support structure according to claim 2, wherein the tensioner comprises a first securing element connectable in a form fit and/or force fit to a second securing element that is structured to correspond in shape to the first securing element and is mountable on the inner vehicle wall, in that one of the first or second securing element is insertable into the other of the first or second securing element.

5. The support structure according to claim 4, wherein multiple second securing elements are embodied as part of a securing rail, and
   wherein the securing rail is mountable on the inner vehicle wall.

6. The support structure according to claim 1, wherein the support body is reversibly height-adjustable in a use state via the at least one lifting device.

7. The support structure according to claim 6, wherein the at least one lifting device comprises at least one lifter structured and arranged to support the support body in a suspended manner, wherein a usable length of the at least one lifter is variable or adjustable to lower or raise the support body.

8. The support structure according to claim 7, wherein the at least one lifting device comprises at least one lifter winder structured to actuate the at least one lifter, so that the usable length thereof is varied or adjusted.

9. The support structure according to claim 6, wherein the at least one lifting device is embodied or controllable such that an angular position or inclination of the support surface is maintained during a height adjustment or lowering and/or raising of the support body.

10. The support structure according to claim 1, wherein the at least one securing device comprises at least one spring element arranged one of:
    to secure the support body to the inner vehicle wall, or
    to tension the support body to the inner vehicle wall,
    wherein the support body is loaded with a spring force of the at least one spring element, so that a movement of the support body in the movement direction against the spring force is enabled to a limited extent.

11. The support structure according to claim 10, wherein the at least one securing device comprises a tensioner structured and arranged to tension the support body to the inner vehicle wall, and
    wherein the spring force of the at least one spring element is applied to the tensioner.

12. The support structure according to claim 10, wherein the at least one securing device comprises an operating device with which the spring force is adjustable.

13. The support structure according to claim 12, wherein a deflection of the at least one spring element is changeable using the operating device in order to adjust the spring force.

14. The support structure according to claim 12, wherein the at least one securing device comprises a tensioner structured and arranged to tension the support body to the inner vehicle wall, and
    wherein the operating device is embodied to adjust a tension of the tensioner in a securing state in order to change the deflection of the at least one spring element.

15. The support structure according to claim 11, wherein the at least one spring element is embodied with a helical spring, wherein separating pieces are arranged between coils of the helical spring in order to prevent directly adjacent coils from colliding with one another.

16. The support structure according to claim 1, wherein the support structure comprises at least one spacer element which, in a use state, is arranged between the support body and the inner vehicle wall, so that the support body is pressable against the at least one spacer element in the securing state.

17. The support structure according to claim 16, wherein the at least one spacer element comprises a fixing device with which the at least one spacer element is magnetically secured to the support body or the inner vehicle wall.

18. The support structure according to claim 1, wherein the support body comprises at least one awning with an awning cover, and
wherein the awning cover is connected to an upper structure of the support body and is movable to be extended or retracted relative to the upper structure.

19. The support structure according to claim 1, wherein the support body comprises a table formed with a table top, and
wherein the table top is arranged to be movable relative to the support surface.

20. A vehicle having a support structure according to claim 1,
wherein the support structure is arranged in a suspended manner in the vehicle using the at least one lifting device such that the support structure is movable relative to the vehicle in the movement direction, and
wherein the support structure is securable in the movement direction to the inner vehicle wall of the vehicle using the at least one securing device.

21. The vehicle according to claim 20, wherein the support body comprises at least one awning, wherein the at least one awning is moveable to be extended or retracted through an open door of the vehicle.

22. The vehicle according to claim 21, wherein the vehicle comprises a stay placement device that is movable relative to a body of the vehicle into a bracing position protruding away from the body, in order to brace an awning stay of the at least one awning against an awning cover in the bracing position using the stay placement device.

23. The vehicle according to claim 22, wherein the stay placement device is formed with an extendable compartment in order to place or brace the awning stay on a base surface of the compartment in an extended state of the compartment.

24. The support structure according to claim 1 being a bed structure.

25. The support structure according to claim 1, wherein the vehicle is a recreational vehicle.

* * * * *